United States Patent
Ba et al.

(10) Patent No.: US 10,734,839 B2
(45) Date of Patent: Aug. 4, 2020

(54) SMART METERS FOR MONITORING INDIVIDUAL AND MULTIPLE ENERGY CONSUMING DEVICES

(71) Applicant: International Business Machines Corporation, Armonk, NY (US)

(72) Inventors: Amadou Ba, Dublin (IE); Joern Ploennigs, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 265 days.

(21) Appl. No.: 15/826,755

(22) Filed: Nov. 30, 2017

(65) Prior Publication Data

US 2019/0165605 A1    May 30, 2019

(51) Int. Cl.
*H02J 13/00* (2006.01)
*G05B 13/02* (2006.01)

(52) U.S. Cl.
CPC ........ *H02J 13/0017* (2013.01); *G05B 13/026* (2013.01)

(58) Field of Classification Search
CPC .................... H02J 13/0017; G05B 13/026
See application file for complete search history.

(56) References Cited

U.S. PATENT DOCUMENTS

| | | |
|---|---|---|
| 8,000,911 B2 | 8/2011 | Carter et al. |
| 8,145,540 B2 | 3/2012 | Lefevre et al. |
| 8,170,695 B2 | 5/2012 | Spicer et al. |
| 9,043,622 B2 | 5/2015 | Isozaki et al. |
| 9,310,865 B2 | 4/2016 | G et al. |
| 2012/0083930 A1 | 4/2012 | Ilic et al. |
| 2012/0166233 A1 | 6/2012 | Wengrovitz et al. |
| 2012/0271472 A1 | 10/2012 | Brunner et al. |
| 2013/0144769 A1 | 6/2013 | Swaminathan et al. |
| 2013/0246801 A1 | 9/2013 | Takahashi et al. |
| 2013/0338948 A1 | 12/2013 | Zeifman |
| 2014/0149056 A1 | 5/2014 | Lelkens et al. |

(Continued)

FOREIGN PATENT DOCUMENTS

| | | |
|---|---|---|
| CA | 2826561 A1 | 8/2012 |
| CA | 2787580 C | 7/2016 |

(Continued)

OTHER PUBLICATIONS

Alles et al., "A Commercial Disaggregation System for Residential and Light Commercial Buildings", NILM Workshop 2014, University of Texas at Austin, Jun. 3, 2014, 4 pages, http://nilmworkshop14.files.wordpress.com/2014/05/alles_commercial.

(Continued)

*Primary Examiner* — Mischita L Henson
(74) *Attorney, Agent, or Firm* — Edward J. Wixted, III; Brian M. Restauro

(57) ABSTRACT

A first instruction is sent to an integrated smart meter to initialize the integrated smart meter. A second instruction is sent to the integrated smart meter to establish a connection with an energy consuming device. The established connection between the integrated smart meter and the energy consuming device is determined to be acceptable. A third instruction is sent to the integrated smart meter to monitor the energy consuming device. Energy consumption data of the energy consuming device is received from the integrated smart meter.

15 Claims, 3 Drawing Sheets

(56) References Cited

U.S. PATENT DOCUMENTS

| | | | |
|---|---|---|---|
| 2014/0358839 A1* | 12/2014 | Dhurandhar | G01D 4/00 706/48 |
| 2014/0375474 A1* | 12/2014 | Dietrich | G06F 21/44 340/870.02 |
| 2015/0012147 A1 | 1/2015 | Haghighat-Kashani et al. | |
| 2016/0081127 A1 | 3/2016 | Lee et al. | |
| 2016/0203568 A1 | 7/2016 | Patel | |
| 2017/0054296 A1 | 2/2017 | Daniel et al. | |

FOREIGN PATENT DOCUMENTS

| | | |
|---|---|---|
| CN | 205349603 U | 2/2016 |
| EP | 2096416 A1 | 9/2009 |
| EP | 2671052 B1 | 9/2016 |

OTHER PUBLICATIONS

Bellias, "3 Ways IoT Will Change Smart Meters for Utilities", IBM Internet of Things blog, Dec. 1, 2016, Printed Oct. 3, 2017, 9 pages, http://www.ibm.com/blogs/internet-of-things/smart-meter-grid/.

* cited by examiner

SMART METERS FOR MONITORING INDIVIDUAL AND MULTIPLE ENERGY CONSUMING DEVICES

BACKGROUND

The present invention relates generally to the field of energy monitoring, and more particularly to using smart meters to monitor energy usage of individual and groups of energy consumers.

Smart meters are used by power companies to monitor the energy usage of energy consuming devices. These energy consuming devices in a household range from light emitting diode (LED) nightlights having low energy consumption to heating/ventilation/air conditioning (HVAC) systems having high energy consumption. In an apartment building, each dwelling unit may include the low usage to high usage range of energy consuming devices that the single household uses. Office buildings and factories have an even wider array of energy consuming devices that a power company or owner may wish to monitor. An advantage of smart meters is that a single smart meter is able to wirelessly communicate with a central system.

SUMMARY OF THE INVENTION

Embodiments of the present invention include an approach for using smart meters to monitor energy usage of individual and groups of energy consumers. In one embodiment, a first instruction is sent to an integrated smart meter to initialize the integrated smart meter. A second instruction is sent to the integrated smart meter to establish a connection with an energy consuming device. The established connection between the integrated smart meter and the energy consuming device is determined to be acceptable. A third instruction is sent to the integrated smart meter to monitor the energy consuming device. Energy consumption data of the energy consuming device is received from the integrated smart meter.

DETAILED DESCRIPTION

Embodiments of the present invention provide for using smart meters to monitor energy usage of individual and groups of energy consumers (i.e., energy consuming devices). Current smart meters monitor energy consumption of a group of energy consumers as an aggregate but not as individual energy consumers. Because individual consumers are not monitored, determining abnormal energy consumption in a group of energy consumers is difficult.

Embodiments of the present invention recognize that there is an approach for using smart meters to monitor energy usage of individual and groups of energy consumers. In an embodiment, integrated smart meters are used to monitor both a group of energy consumers and each individual energy consumer in the group of energy consumers. This monitoring approach will allow for the isolation of an individual energy consumer that is using an abnormal amount of energy when compared to historical norms.

References in the specification to "one embodiment", "an embodiment", "an example embodiment", etc., indicate that the embodiment described may include a particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention will now be described in detail with reference to the Figures.

Figure 1:
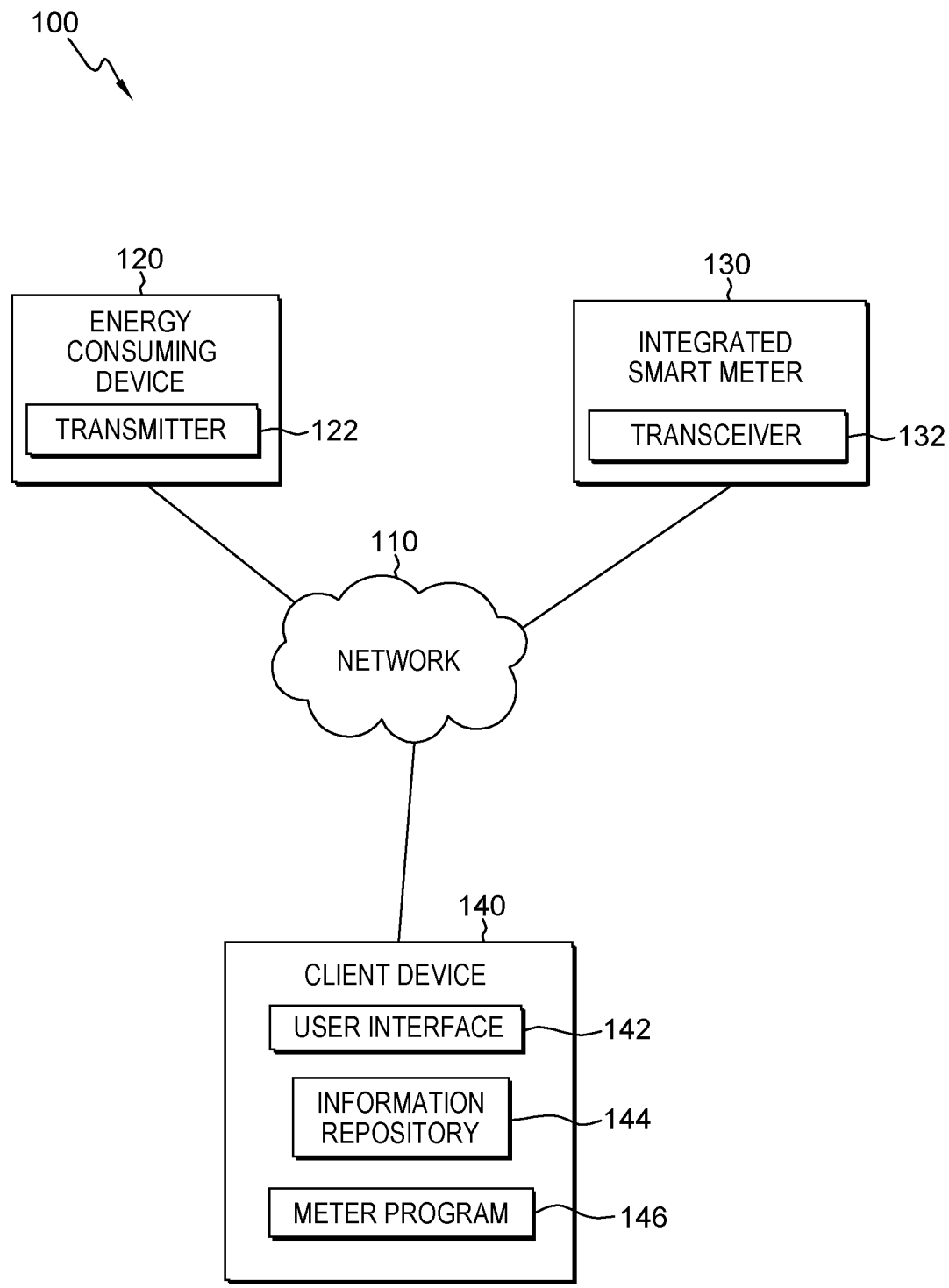
FIG. 1 depicts a functional block diagram of a computing environment, in accordance with an embodiment of the present invention.

FIG. 1 is a functional block diagram illustrating a computing environment, generally designated 100, in accordance with one embodiment of the present invention. FIG. 1 provides only an illustration of one implementation and does not imply any limitations with regard to the systems and environments in which different embodiments may be implemented. Many modifications to the depicted embodiment may be made by those skilled in the art without departing from the scope of the invention as recited by the claims.

In an embodiment, computing environment 100 includes energy consuming device 120, integrated smart meter (ISM) 130, and client device 140, interconnected via network 110. In example embodiments, computing environment 100 may include other computing devices (not shown in FIG. 1) such as smart watches, cell phones, smartphones, wearable technology, phablets, tablet computers, laptop computers, desktop computers, other computer servers or any other computer system known in the art, interconnected to energy consuming device 120, ISM 130, and client device 140, over network 110.

In an embodiment of the present invention, energy consuming device 120, ISM 130, and client device 140 connect to network 110, which enables energy consuming device 120, ISM 130, and client device 140 to access other computing devices and/or data not directly stored on energy consuming device 120, ISM 130, and client device 140. Network 110 may be, for example, a short-range, low power wireless connection, a local area network (LAN), a telecommunications network, a wide area network (WAN) such as the Internet, or any combination of the three, and include wired, wireless, or fiber optic connections. Network 110 may include one or more wired and/or wireless networks that are capable of receiving and transmitting data, voice, and/or video signals, including multimedia signals that include voice, data, and video information. In general, network 110 can be any combination of connections and protocols that will support communications between energy consuming device 120, ISM 130, and client device 140, and any other computing devices connected to network 110, in accordance with embodiments of the present invention. In an embodiment, data received by another computing device (not shown in FIG. 1) in computing environment 100 may be communicated to energy consuming device 120, ISM 130, and client device 140 via network 110.

In an embodiment, energy consuming device 120 is a device that consumes electricity. According to an embodiment of the present invention, energy consuming device 120 can be any number of devices found in a home or apartment building (e.g., electronic equipment such as a computer, television, wireless router, etc., kitchen appliances such as a refrigerator, range, dishwasher, microwave, etc., mechanical system devices such as a boiler, water heater, air conditioner, whole-house fan, hot air furnace, etc., and any number of other energy consuming devices such as lighting, personal appliances like a hair dryer, garage door openers, and the like). According to another embodiment, energy consuming device 120 can be any number of devices found in an office building (e.g., lighting, telephones, computers, computer monitors, copiers, fax machines, heating/ventilation/cooling (HVAC) equipment, coffee machines, vending machines, water heaters, radios, televisions, etc.). According to yet another embodiment, energy consuming device 120 can be any number of device found in a factory (e.g., office equipment, lighting, HVAC equipment, production equipment such as robots, stamping presses, welders, pick and place tools, reflow ovens, electric arc furnaces, and any number of other tools and appliances that consume electricity). In an embodiment, computing environment 100 may include any number of energy consuming device 120.

According to an embodiment of the present invention, energy consuming device 120 includes transmitter 122. In an embodiment, transmitter 122 is a telemetry device (i.e., telemeter) which converts measurements from a sensor into a signal, and sends it, via wires or a wireless connection, to be received by some display or control device located a distance away. Telemetry is an automated communications process by which measurements and other data are collected at remote or inaccessible points and transmitted to receiving equipment for monitoring. In an embodiment, transmitter 122 collects energy usage data from an energy consuming device and sends the energy usage to meter program 146 via network 110.

In an embodiment, integrated smart meter (ISM) 130 is an electronic device that records consumption of electrical energy usage in intervals of an hour or less and communicates that information at least daily back to a central location. ISM 130 includes two-way communication, via a transceiver such as transceiver 132, between ISM 130 and the central location. Unlike home energy monitors, ISM 130 can gather data for remote reporting. The advanced metering infrastructure (AMI) used by ISM 130 differs from traditional automatic meter reading (AMR) in that AMI enables two-way communications with ISM 130. Communications from ISM 130 to the network can be done via fixed wired connections (such as power line communications) or via wireless connections. In using wireless, options include cellular communications, wireless fidelity (i.e., Wi-Fi), wireless ad hoc networks over Wi-Fi, wireless mesh networks, and the like. In an embodiment, ISM 130 can measure the amount of electric energy consumed by a residence or business (i.e., multiple energy consumers) or a single, electrically powered device (i.e., an individual energy consumer).

According to an embodiment of the present invention, ISM 130 includes transceiver 132. In an embodiment, transceiver 132 is a combination transmitter/receiver of digital signals in a single package. In an embodiment, transceiver 132 receives data from energy consuming device 120 and client device 140. In another embodiment, transceiver 132 sends data to client device 140. In yet another embodiment, transceiver 132 both receives data from and sends data to client device 140. In yet another embodiment, transceiver 132 may send and receive data from other devices and transceivers (not shown in FIG. 1). In an embodiment, a type of data sent and received by transceiver 132 is energy usage data of (i) an individual energy consumer and (ii) a group of energy consumers as an aggregate.

According to embodiments of the present invention, client device 140 may be a laptop, tablet, or netbook personal computer (PC), a desktop computer, a personal digital assistant (PDA), a smartphone, a phablet, a smart watch, a fitness tracker or any other wearable technology, a smart television, a smart digital video recorder, a security camera, a smart automobile, or any other programmable electronic device capable of communicating with any other computing device within computing environment 100. In certain embodiments, client device 140 represents a computer system utilizing clustered computers and components (e.g., database server computers, application server computers, etc.) that act as a single pool of seamless resources when accessed by elements of computing environment 100. In general, client device 140 is representative of any electronic device or combination of electronic devices capable of executing computer readable program instructions. Client device 140 may include components as depicted and described in further detail with respect to FIG. 3, in accordance with embodiments of the present invention.

According to an embodiment of the present invention, client device 140 includes user interface 142, information repository 144, and meter program 146. In an embodiment, user interface 142 provides an interface between a user of client device 140, network 110 and any other devices connected to network 110. User interface 142 allows a user of client device 140 to interact with the Internet and also enables the user to receive an indicator of one or more previous viewing locations and a summary of viewing history on the Internet. In general, a user interface is the space where interactions between humans and machines occur. User interface 142 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. User interface 142 may also be mobile application software that provides an interface between a user of client device 140 and network 110. Mobile application software, or an "app," is a computer program designed to run on smartphones, phablets, tablet computers and other mobile devices.

In an embodiment, information repository 144 may be storage that may be written to and/or read by meter program 146. In one embodiment, information repository 144 resides on client device 140. In another embodiment, information repository 144 may reside on any other device (not shown in FIG. 1) in computing environment 100, in cloud storage or on another computing device accessible via network 110. In yet another embodiment, information repository 144 may represent multiple storage devices within client device 140. Examples of data stored to information repository 144 include energy used by a plurality of energy consuming device 120, both as a single energy consumer and an aggregate of multiple energy consumers.

In an embodiment, information repository 144 may be implemented using any volatile or non-volatile storage media for storing information, as known in the art. For example, information repository 144 may be implemented with a tape library, optical library, one or more independent hard disk drives, multiple hard disk drives in a redundant array of independent disks (RAID), solid-state drives (SSD), or random-access memory (RAM). Similarly, information repository 144 may be implemented with any suitable storage architecture known in the art, such as a relational database, an object-oriented database, or one or more tables. In an embodiment of the present invention, meter program 146 and any other programs and applications (not shown in FIG. 1) operating on client device 140 may store, read, modify, or write data to information repository 144.

According to embodiments of the present invention, meter program 146 is a program, a subprogram of a larger program, an application, a plurality of applications, or mobile application software, which functions to collect energy usage data from integrated smart meters, such as ISM 130, to analyze the collected data to determine anomalies in the energy usage data, and to predict energy usage of energy consuming devices. A program is a sequence of instructions written by a programmer to perform a specific task. In an embodiment, meter program 146 uses the energy usage (i.e., consumption) data from a plurality of integrated smart meters (e.g., ISM 130 to monitor the energy used by one or more energy consuming devices (e.g., energy consuming device 120). In the embodiment, meter program 146 can determine if an anomalous energy usage data point exists and can predict a new data point based on past data points. Meter program 146 may run by itself but may be dependent on system software (not shown in FIG. 1) to execute. In one embodiment, meter program 146 functions as a stand-alone program residing on client device 140. In another embodiment, meter program 146 may work in conjunction with other programs, applications, etc., found in computing environment 100. In yet another embodiment, meter program 146 may be found on ISM 130 or on other computing devices (not shown in FIG. 1) in computing environment 100, which are interconnected to client device 140 via network 110.

Figure 2:
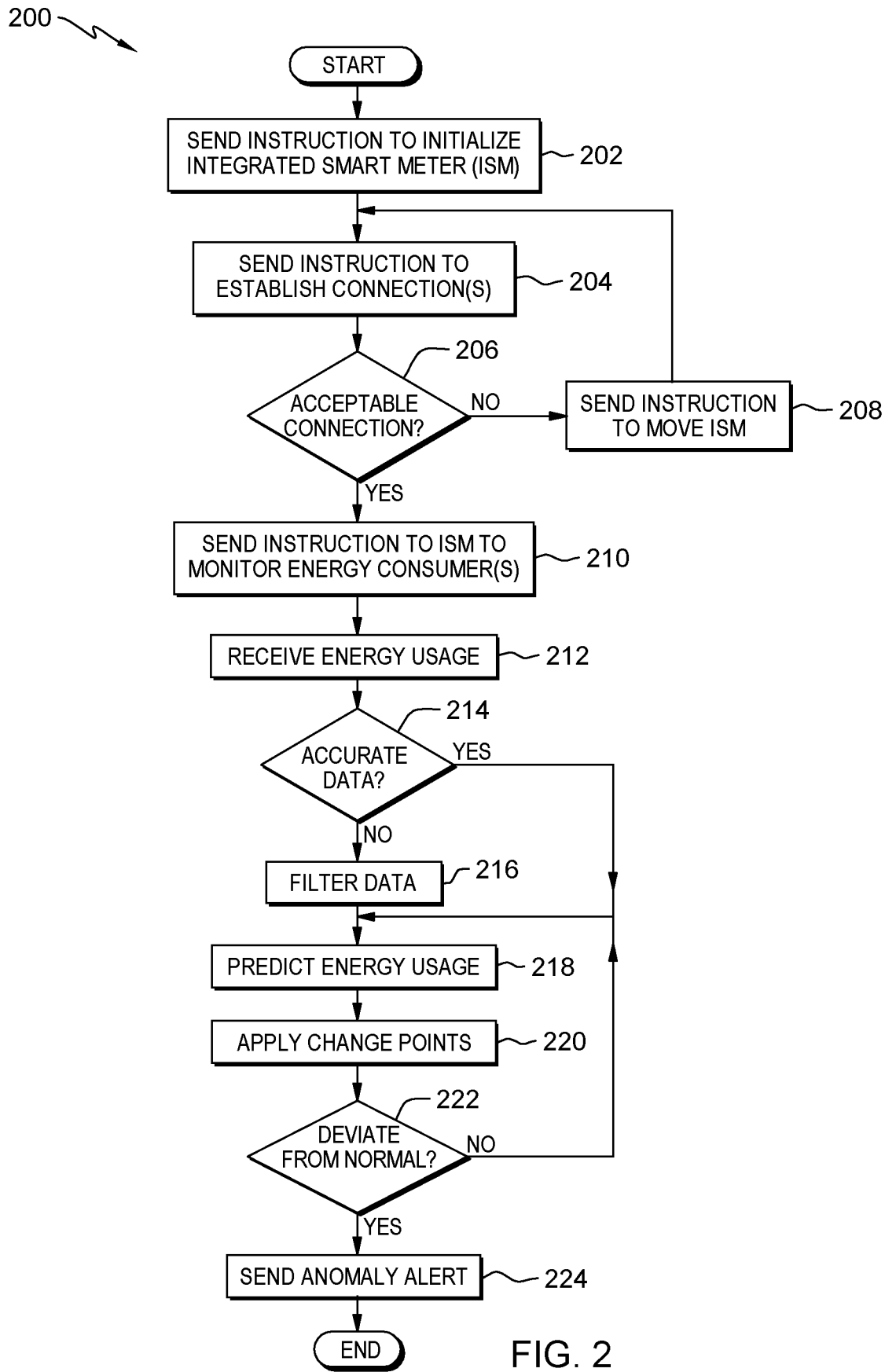
FIG. 2 depicts a flowchart of a program for using smart meters to monitor energy usage of individual and groups of energy consumers, in accordance with an embodiment of the present invention.

FIG. 2 is a flowchart of workflow 200 depicting an approach for collecting energy usage data from integrated smart meters, such as ISM 130, analyzing the collected data to determine anomalies in the energy usage data, and predicting energy usage when an anomaly is detected. In one embodiment, the method of workflow 200 is performed by meter program 146. In an alternative embodiment, the method of workflow 200 may be performed by any other program working with meter program 146. In an embodiment, a user may invoke workflow 200 upon powering on client device 140. In an alternative embodiment, a user may invoke workflow 200 upon accessing meter program 146.

In an embodiment, meter program 146 sends an instruction to initialize an integrated smart meter (ISM) (step 202). In other words, meter program 146 transmits an instruction to turn on an ISM to prepare the ISM for energy monitoring. In an embodiment, meter program 146 transmits the instruction to the ISM over an available network, such as a local area network (LAN), a telecommunications network, a wide area network (WAN), or any combination of the three, and the network can include wired, wireless, or fiber optic connections. In an embodiment, meter program 146 transmits an instruction to initialize to ISM 130 over network 110. For example, an ISM is turned on in a minimalist vacation home (i.e., cabin) owned by "Joe".

In an embodiment, meter program 146 sends an instruction to establish connections (step 204). In other words, meter program 146 transmits an instruction to an ISM to establish a connection with each available energy consuming device connected to the network. In an embodiment, an ISM and a group of energy consuming devices, such as energy consuming device 120, are connected to a network. In the embodiment, the ISM establishes a connection with each of the group of energy consuming devices via the network so that each energy consuming device can transmit data to the ISM. In an embodiment, meter program 146 transmits an instruction to ISM 130 to establish a connection with energy consuming device 120 via network 110. For example, a connection is established in the cabin owned by "Joe" between an ISM and each of five energy consuming devices (an overhead light, a microwave oven, a water heater, a refrigerator, and a laptop computer) owned by "Joe". In the example, the rated energy consumption of each device is as follows: overhead light—ten watts; microwave oven—eleven hundred watts; water heater—four thousand watts (or four kilowatts); refrigerator—one hundred fifty watts; and laptop—fifty watts.

In an embodiment, meter program 146 determines whether the established connection is acceptable (decision step 206). In other words, meter program 146 determines whether the signal strength of the connection, as determined by an ISM, established between the ISM and each of a group of energy consuming devices is acceptable (i.e., above a threshold value). In an embodiment (decision step 206, NO branch), meter program 146 determines that the signal strength is not above a threshold value; therefore, meter program 146 proceeds to step 208 and sends an instruction to relocate (i.e., move) the ISM. In the embodiment (decision step 206, YES branch), meter program 146 determines that the signal strength is above a threshold value; therefore, meter program 146 proceeds to step 210 to send an instruction to the ISM to start monitoring.

In an embodiment, meter program 146 sends an instruction to move the ISM (step 208). In other words, responsive to determining that the signal strength of the energy consuming device is not above a threshold value, meter program 146 transmits an instruction to a user to move (i.e., relocate) the ISM in an attempt to improve the signal strength, as determined by the ISM, of the energy consuming device. In an embodiment, meter program 146 transmits an instruction to the user of client device 140 to move ISM 130 from a first location to a second location to improve the signal strength of energy consuming device 120, as determined by ISM 130. For example, "Joe" determines that the signal strength, read by the ISM in the cabin, of the water heater owned by "Joe" is not above a threshold value so "Joe" relocates the ISM to another location. After moving the ISM, "Joe" determines that the ISM is receiving acceptable signals above a threshold value from the overhead light, microwave oven, water heater, refrigerator, and the laptop.

In an embodiment, meter program 146 sends an instruction to an ISM to begin to monitor at least one energy consuming device (step 210). In other words, meter program 146 transmits an instruction to an ISM to start monitoring the electric usage of one or more energy consuming devices. In an embodiment, after receiving the instruction from meter program 146, the ISM transmits a request to one or more energy consuming devices requesting that each energy consuming device transmit the amount of energy being consumed by that energy consuming device to the ISM. In an embodiment, each energy consumer transmits its energy consumption hourly at the top of the hour. In another embodiment, each energy consumer transmits its energy consumption daily at midnight. In yet another embodiment, each energy consumer transmits its energy consumption on any frequency determined by a user. In an embodiment, meter program 146 transmits an instruction to ISM 130 via network 110 which in turn transmits a request to energy consuming device 120 also over network 110. In response to the request from ISM 130, energy consuming device 120 transmits, on a certain time interval, the amount of energy consumed by energy consuming device 120 to ISM 130. For example, the ISM in the cabin owned by "Joe" prompts the overhead light, microwave oven, water heater, refrigerator, and laptop to transmit energy usage of each energy consumer back to the ISM.

In an embodiment, meter program 146 receives energy usage (step 212). In other words, meter program 146 receives the energy consumption data, from the ISM, of each energy consumer being monitored by the ISM. Meter program 146 also receives the aggregate energy consumption data of all of the energy consumers, monitored by the ISM, combined. In an embodiment, meter program 146 receives the energy consumed by energy consuming device 120 from ISM 130 over network 110. For example, the cabin ISM sends the energy consumed by each of the overhead light, microwave oven, water heater, refrigerator, and laptop to the laptop. The ISM also sends the total combined energy consumed by the overhead light, microwave oven, water heater, refrigerator and laptop. The energy consumption data is sent once a day at noon. The current energy usage for the past day is as follows: overhead light—sixty watt-hours (six hours of use); microwave oven—three hundred thirty watt-hours (eighteen minutes of use); water heater—eight thousand watt-hours (two hours of use); refrigerator—three thousand six hundred watt-hours (twenty-four hours of use); and laptop—two hundred watt-hours (four hours of use). The total energy consumption of the five energy consumers is twelve thousand, one hundred, ninety watt-hours.

In an embodiment, meter program 146 determines whether the received energy usage is accurate (decision step 214). In other words, meter program 146 determines whether the received energy consumption data is accurate (i.e., within an expected range) by comparing the energy usage to a historical usage from past monitoring while factoring in variables such as changes to the building (e.g., window area in the building was doubled) and weather (e.g., higher than normal temperatures would drive increased air conditioning usage). In an embodiment (decision step 214, NO branch), meter program 146 determines that the received energy usage data is not accurate; therefore, meter program 146 proceeds to step 216 to filter the data. In the embodiment (decision step 214, YES branch), meter program 146 determines that the received energy data is accurate; therefore, meter program 146 proceeds to step 218 to predict energy usage.

In an embodiment, meter program 146 filters data (step 216). In other words, responsive to determining that the received energy usage data is not accurate, meter program 146 filters the data to remove outliers in the data and/or to add in missing data. In an embodiment, data outliers (i.e., data that does not fit with previous results) can be removed by applying a median type filter to the data. A median filter is a non-linear digital filter capable of efficiently removing noise from a signal. The primary idea of the filter is to exploit a signal entry by replacing each entry in the median with the median of the nearest neighbor. In the embodiment, the median type filter removes "noisy" data (i.e., data that does not fit the rest of the data). In another embodiment, missing data can be replaced using any interpolation method known in the art. Interpolation is a method of constructing new data points within the range of a discrete set of known data points. According to an embodiment of the present invention, meter program 146 on client device 140 applies a median filter to the energy usage data received from ISM 130 to remove an outlier data point. For example, the reported energy usage of 8000 watt-hours for the water heater is higher than normal (a faulty temperature probe was discovered which reported the water temperature lower than the actual value causing the water heater to run more frequently than usual) so using interpolation of past data points, the 8000 watt-hours data point was replaced with a value of 6000 watt-hours.

In an embodiment, meter program 146 predicts energy usage (step 218). In other words, meter program 146 uses online machine learning, which is a method of machine learning in which data becomes available in a sequential order and is used to update a best predictor for future data, to predict future energy usage. In an embodiment, meter program 146 retrieves energy usage data for energy consuming device 120 from information repository 144 and applies online machine learning to predict a future energy usage data point for energy consuming device 120. For example, a program on the laptop owned by "Joe" predicts that the overhead light owned by "Joe" will use eighty watt-hours of energy during the next monitoring period.

In an embodiment, meter program 146 determines if the predicted energy usage deviates from received energy usage (decision step 220). In other words, meter program 146 determines whether the predicted energy usage deviates from the received (i.e., actual) energy usage. In an embodiment, the determination is made by the value of the residual energy; if the residual energy value exceeds a threshold value, the predicted energy usage deviates from the actual energy usage. According to an embodiment of the present invention, the residual energy value is the calculated delta between the predicted energy usage and the actual energy usage. In an embodiment, the threshold value is determined by the user and is a percentage of the actual energy (e.g., ten percent). In another embodiment, the threshold value is determined by meter program 146. According to an embodiment of the present invention, the closer the residual value is to zero, the more accurate the predicted energy usage. According to the embodiment, as the residual value increases, the likelihood of an anomaly in the energy usage of the particular energy consuming device increases. In an embodiment, residual values for each energy consuming device, such as energy consuming device 120, are stored to a memory, such as information repository 144, so that an average residual usage can be compared to the current residual energy usage. In an embodiment (decision step 220, YES branch), meter program 146 determines that the residual energy usage exceeds a threshold value; therefore, meter program 146 proceeds to step 222 to send an anomaly alert. In the embodiment (decision step 220, NO branch), meter program 146 determines that the residual energy usage value does not exceed a threshold value; therefore; meter program 146 returns to step 218 to predict an energy usage for an energy consuming device.

In an embodiment, meter program 146 sends an anomaly alert (step 222). In other words, responsive to determining that the residual energy usage value for an energy consumer or a group of energy consumers has exceeded a threshold value, meter program 146 sends an anomaly alert. In an embodiment, meter program 146 sends an anomaly alert to a user. In another embodiment, meter program 146 sends an alert to a user interface, such as user interface 142, on a computing device, such as client device 140. In yet another embodiment, meter program 146 sends an alert as a visual alert or an audible signal alert (e.g., flashing light, beeping horn, etc.). According to an embodiment of the present invention, meter program 146 sends an anomaly alert, via a text message, to a smartphone of the user of client device 140. For example, a text message is sent to the smartphone owned by "Joe" alerting "Joe" to the anomalous water heater data point.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Having described embodiments of an approach for collecting energy usage data from integrated smart meters, such as ISM 130, analyzing the collected data to determine anomalies in the energy usage data, and predicting energy usage when an anomaly is detected (which are intended to be illustrative and not limiting), it is noted that modifications and variations may be made by persons skilled in the art in light of the above teachings. It is therefore to be understood that changes may be made in the particular embodiments disclosed which are within the scope of the invention as outlined by the appended claims.

Figure 3:
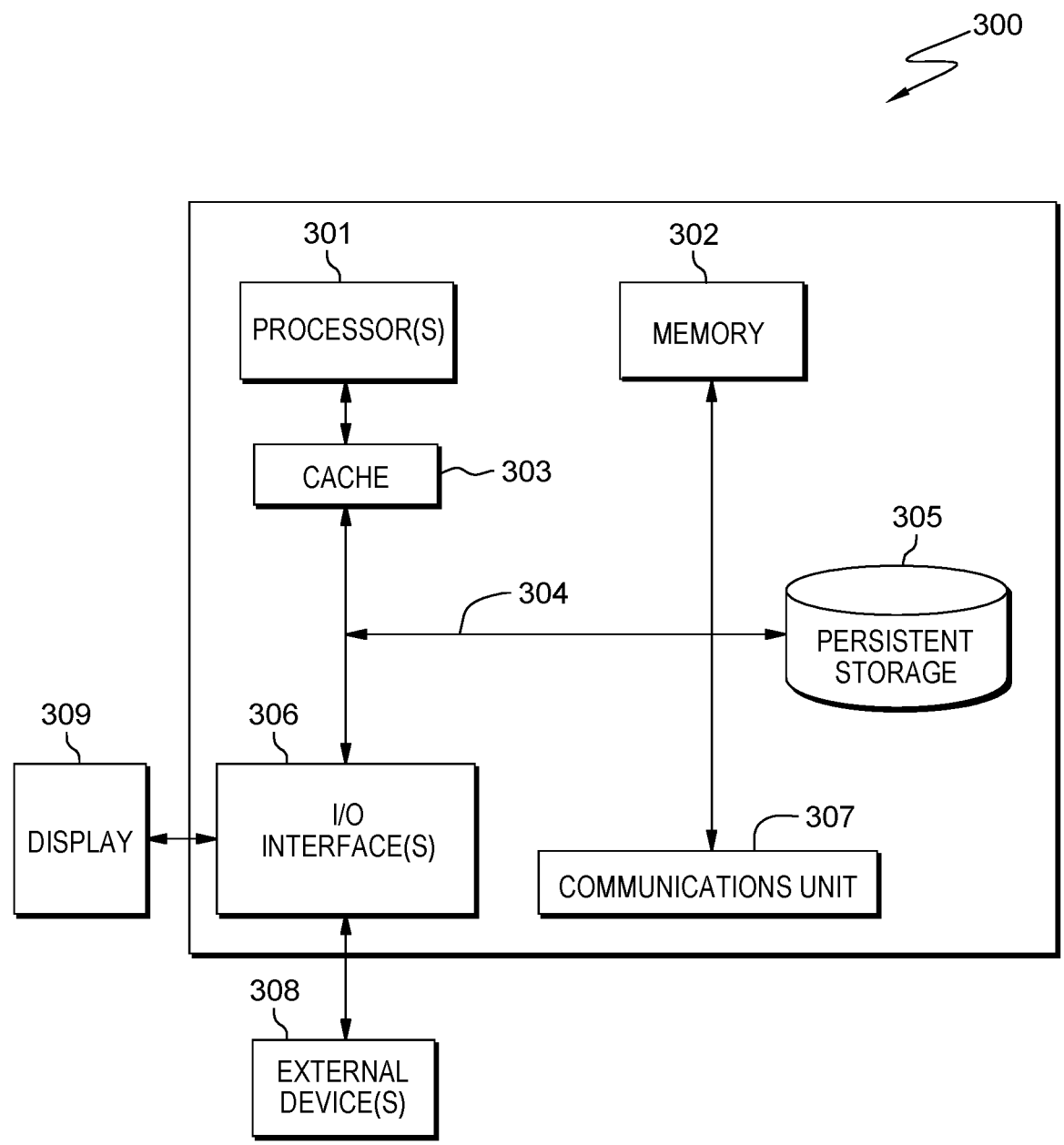
FIG. 3 depicts a block diagram of components of the computing environment of FIG. 1, in accordance with an embodiment of the present invention.

FIG. 3 depicts computer system 300, which is an example of a system that includes meter program 146. Computer system 300 includes processor(s) 301, cache 303, memory 302, persistent storage 305, communications unit 307, input/output (I/O) interface(s) 306 and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention may be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data used to practice embodiments of the present invention may be downloaded to persistent storage 305 through communications unit 307.

I/O interface(s) 306 allows for input and output of data with other devices that may be connected to each computer system. For example, I/O interface 306 may provide a connection to external devices 308 such as a keyboard, keypad, a touchscreen, and/or some other suitable input device. External devices 308 can also include portable computer readable storage media such as, for example, thumb drives, portable optical or magnetic disks, and memory cards. Software and data used to practice embodiments of the present invention can be stored on such portable computer readable storage media and can be loaded onto persistent storage 305 via I/O interface(s) 306. I/O interface(s) 306 also connect to display 309.

Display 309 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A method, the method comprising:
    sending, by one or more computer processors, a first instruction to an integrated smart meter to initialize the integrated smart meter;
    sending, by one or more computer processors, a second instruction to the integrated smart meter to establish a connection with an energy consuming device;
    determining, by one or more computer processors, that the established connection between the integrated smart meter and the energy consuming device is acceptable;
    responsive to determining that the established connection is acceptable, sending, by one or more computer processors, a third instruction to the integrated smart meter to monitor the energy consuming device;
    receiving, by one or more computer processors, from the integrated smart meter, energy consumption data of the energy consuming device;
    determining, by one or more computer processors, that the received energy consumption data is not accurate by comparing the received energy consumption data to historical energy consumption data for the energy consuming device;
    responsive to determining that the received energy consumption data is not accurate, filtering, by one or more computer processors, the energy consumption data;
    predicting, by one or more computer processors, an energy usage of the energy consuming device;
    responsive to determining that the predicted energy usage does not deviate from the received energy usage, predicting, by one or more computer processors, another energy usage of another energy consuming device; and
    responsive to determining that the predicted energy usage deviates from the received energy usage, sending, by one or more computer processors, an anomaly alert.

2. The method of claim 1, wherein filtering the energy consumption data comprises applying a median filter to the data to remove data outliers.

3. The method of claim 1, wherein the step of determining that the predicted energy usage deviates from the received energy usage, comprises:
 calculating, by one or more computer processors, a residual value of energy; and
 determining, by one or more computer processors, whether the residual value of energy exceeds a threshold value.

4. The method of claim 3, wherein the residual value of energy is a delta between the received energy usage and the predicted energy usage.

5. The method of claim 1, wherein the anomaly alert is selected from the group consisting of: an alert sent to a user, an alert sent to a user interface, a visual alert, and an audible alert.

6. The method of claim 1, further comprising:
 determining, by one or more computer processors, that the received energy consumption data is accurate by comparing the received energy consumption data to historical energy consumption data for the energy consuming device;
 responsive to determining that the received energy consumption data is accurate, predicting, by one or more computer processors, the energy usage of the energy consuming device.

7. A computer program product, the computer program product comprising:
 one or more computer readable storage media; and
 program instructions stored on the one or more computer readable storage media, the program instructions comprising:
  program instructions to send a first instruction to an integrated smart meter to initialize the integrated smart meter;
  program instructions to send a second instruction to the integrated smart meter to establish a connection with an energy consuming device;
  program instructions to determine that the established connection between the integrated smart meter and the energy consuming device is acceptable;
  responsive to determining that the established connection is acceptable, program instructions to send a third instruction to the integrated smart meter to monitor the energy consuming device;
  program instructions to receive from the integrated smart meter, energy consumption data of the energy consuming device;
  program instructions to determine that the received energy consumption data is not accurate by comparing the received energy consumption data to historical energy consumption data for the energy consuming device;
  responsive to determining that the received energy consumption data is not accurate, program instructions to filter the energy consumption data;
  program instructions to predict an energy usage of the energy consuming device;
  responsive to determining that the predicted energy usage does not deviate from the received energy usage, program instructions to predict another energy usage of another energy consuming device; and
  responsive to determining that the predicted energy usage deviates from the received energy usage, program instructions to send an anomaly alert.

8. The computer program product of claim 7, wherein filtering the energy consumption data comprises applying a median filter to the data to remove data outliers.

9. The computer program product of claim 7, wherein the program instructions to determine that the predicted energy usage deviates from the received energy usage, comprises:
 program instructions to calculate a residual value of energy; and
 program instructions to determine whether the residual value of energy exceeds a threshold value.

10. The computer program product of claim 9, wherein the residual value of energy is a delta between the received energy usage and the predicted energy usage.

11. The computer program product of claim 7, wherein the anomaly alert is selected from the group consisting of: an alert sent to a user, an alert sent to a user interface, a visual alert, and an audible alert.

12. The computer program product of claim 7, further comprising program instructions stored on the one or more computer readable storage media, to:
 determine that the received energy consumption data is accurate by comparing the received energy consumption data to historical energy consumption data for the energy consuming device;
 responsive to determining that the received energy consumption data is accurate, predict the energy usage of the energy consuming device.

13. A computer system, the computer system comprising:
 one or more computer processors;
 one or more computer readable storage media; and
 program instructions stored on the one or more computer readable storage media for execution by at least one of the one or more computer processors, the program instructions comprising:
  program instructions to send a first instruction to an integrated smart meter to initialize the integrated smart meter;
  program instructions to send a second instruction to the integrated smart meter to establish a connection with an energy consuming device;
  program instructions to determine that the established connection between the integrated smart meter and the energy consuming device is acceptable;
  responsive to determining that the established connection is acceptable, program instructions to send a third instruction to the integrated smart meter to monitor the energy consuming device;
  program instructions to receive from the integrated smart meter, energy consumption data of the energy consuming device;
  program instructions to determine that the received energy consumption data is not accurate by comparing the received energy consumption data to historical energy consumption data for the energy consuming device;
  responsive to determining that the received energy consumption data is not accurate, program instructions to filter the energy consumption data;
  program instructions to predict an energy usage of the energy consuming device;
  responsive to determining that the predicted energy usage does not deviate from the received energy usage, program instructions to predict another energy usage of another energy consuming device; and responsive to determining that the predicted energy usage deviates from the received energy usage, program instructions to send an anomaly alert.

14. The computer system of claim 13, wherein filtering the energy consumption data comprises applying a median filter to the data to remove data outliers.

15. The computer system of claim 13, wherein the program instructions to determine that the predicted energy usage deviates from the received energy usage, comprises:
   program instructions to calculate a residual value of energy; and
   program instructions to determine whether the residual value of energy exceeds a threshold value.

* * * * *